United States Patent
Hua et al.

(10) Patent No.: US 7,383,278 B2
(45) Date of Patent: Jun. 3, 2008

(54) SYSTEMS AND METHODS FOR CHANGING ITEMS IN A COMPUTER FILE

(75) Inventors: Li Hua, Redmond, WA (US); Daniel B. Jump, Duvall, WA (US); Isaac E. Nichols, Seattle, WA (US); David B. Ornstein, Seattle, WA (US); Joshua M. Pollock, Seattle, WA (US); Ravishankar Shanmugam, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 394 days.

(21) Appl. No.: 11/018,863

(22) Filed: Dec. 20, 2004

(65) Prior Publication Data

US 2006/0136356 A1 Jun. 22, 2006

(51) Int. Cl.
    G06F 17/40 (2006.01)
(52) U.S. Cl. ............... 707/102; 707/101; 707/205
(58) Field of Classification Search ........... 707/101, 707/205, 1, 102, 201, 202, 203, 204, 10; 709/203, 218, 332; 715/501.1, 505, 511; 717/162
    See application file for complete search history.

(56) References Cited

U.S. PATENT DOCUMENTS

| | | | | |
|---|---|---|---|---|
| 5,964,872 A | * | 10/1999 | Turpin ........................... 713/1 |
| 6,141,663 A | * | 10/2000 | Hunkins et al. ............. 707/201 |
| 6,880,155 B2 | * | 4/2005 | Schwabe et al. ............. 717/162 |
| 7,158,984 B2 | * | 1/2007 | Fairweather ................. 707/101 |
| 7,254,784 B2 | * | 8/2007 | Chang ......................... 715/810 |
| 2003/0028686 A1 | * | 2/2003 | Schwabe et al. ............. 709/332 |
| 2004/0046804 A1 | * | 3/2004 | Chang ......................... 345/810 |
| 2004/0139042 A1 | * | 7/2004 | Schirmer et al. .............. 707/1 |

OTHER PUBLICATIONS

Pkware Inc., ZIP File Format Specification, APPNOTE.TXT, Version 6.2.0—Notification of Change, 44 pages (revised Apr. 26, 2004).
Mark Nelson, "A Fresh Cup of Zip," http://www.dogma.net/markn/articles/JavaZip/JavaZip.html, 6 pages ( © 1997-1998).

* cited by examiner

*Primary Examiner*—Shahid A Alam
(74) *Attorney, Agent, or Firm*—Merchant & Gould P.C.

(57) ABSTRACT

Systems and methods for changing items of a computer file can include a storage medium, and an application programmed to create a file including a first item and a second item, the application storing the file on the storage medium, and the first item including padding. The system can also include an input/output module associated with the application, the input/output module being programmed to use at least a portion of the padding of the first item to accommodate a change in a size of the first item. A method can include providing a file including at least a first item and a second item, the first item including padding, changing the first item, and using at least a portion of the padding of the first item to accommodate a change in a size of the first item.

17 Claims, 9 Drawing Sheets

| |
|---|
| [Local Header - Item A]<br>[Item Name A]<br>[Extra Field A]<br>[Item Data A] |
| [Local Header - Item B]<br>[Item Name B]<br>[Extra Field B]<br>[Item Data B] |
| [Local Header - Item C]<br>[Item Name C]<br>[Extra Field C]<br>[Item Data C] |
| [Local Header - Item D]<br>[Item Name D]<br>[Extra Field D]<br>[Item Data D] |
| [Central Directory] |

SYSTEMS AND METHODS FOR CHANGING ITEMS IN A COMPUTER FILE

RELATED APPLICATION

This application relates to application Ser. No. 11/018,386, entitled "Systems and Methods for Changing Items in a Computer File," and filed on even date herewith, the entirety of which is hereby incorporated by reference.

TECHNICAL FIELD

Embodiments of the present invention relate to systems and methods for storing and updating items in a computer file.

BACKGROUND

A computer file can include a variety of data. For example, a file created by a word processing program such as Microsoft® Word can include formatted text and embedded objects such as pictures. In addition, the file can include metadata, or data relating to attributes of the file itself. The file can include other types of data as well. The file can be saved to a recordable storage medium in a variety of formats. One example format includes a non-binary format, such as plain text. Another example format includes a binary format that is typically compressed and/or structured in a way that is easy for a program to read.

One example binary format is the .ZIP file format (sometimes referred to herein as an "archive file"). Within an archive file, a plurality of archive items can be saved. Each archive item is generally defined by a header and is followed by the contents for the item. The archive items are saved as contiguous blocks within the archive file.

For example, an archive file including three archive items A, B, and C can look as follows:

| |
|---|
| Item A |
| Item B |
| Item C |

In the example shown, item A of the archive file is metadata associated with the file, item B is text associated with the file, and item C is an embedded object such as a picture associated with the file.

When it is necessary to modify the contents of a particular archive item in an archive file, such as archive item A above, the archive item can change in size (i.e., grow or shrink). When archive item A grows or shrinks in size, it is necessary to rewrite the contents of following items B and C because of the contiguous nature of the archive file format. Further, because an archive file can sometimes be written in a compressed format, changes in the contents of the file can cause the file to grow or shrink in unpredictable ways.

For example, if item A increases in size, items B and C need to be shifted to accommodate the change in size of item A, as shown below:

| Original: | Modified: |
|---|---|
| Item A | Item A |
| Item B | |
| Item C | Item B |
| | Item C |

Rewriting all of items that following an item in an archive that is changed can be costly both in terms of performance and the resources used to rewrite the archive items.

It is therefore desirable to provide systems and methods that can efficiently change items in a file.

SUMMARY

Embodiments of the present invention relate to systems and methods for storing and updating items in a computer file.

One example embodiment of the invention relates to a computing system, including a storage medium, and an application programmed to create a file including a first item and a second item, the application storing the file on the storage medium, and the first item including padding. The system also includes an input/output module associated with the application, the input/output module being programmed to use at least a portion of the padding of the first item to accommodate a change in a size of the first item.

Another example embodiment of the invention relates to a method for changing items of a file, including: providing a file including at least a first item and a second item, the first item including padding, changing the first item, and using at least a portion of the padding of the first item to accommodate a change in a size of the first item.

Yet another embodiment of the invention relates to a computer-readable medium having computer-executable instructions for performing steps including: providing a file including at least a first item and a second item, the first item including padding, changing the first item, and using at least a portion of the padding of the first item to accommodate a change in a size of the first item.

BRIEF DESCRIPTION OF THE DRAWINGS

Reference will now be made to the accompanying drawings, which are not necessarily drawn to scale, and wherein.

DETAILED DESCRIPTION

The present invention will now be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments of the present invention relate to systems and methods for storing and updating items of a computer file.

Figure 1:
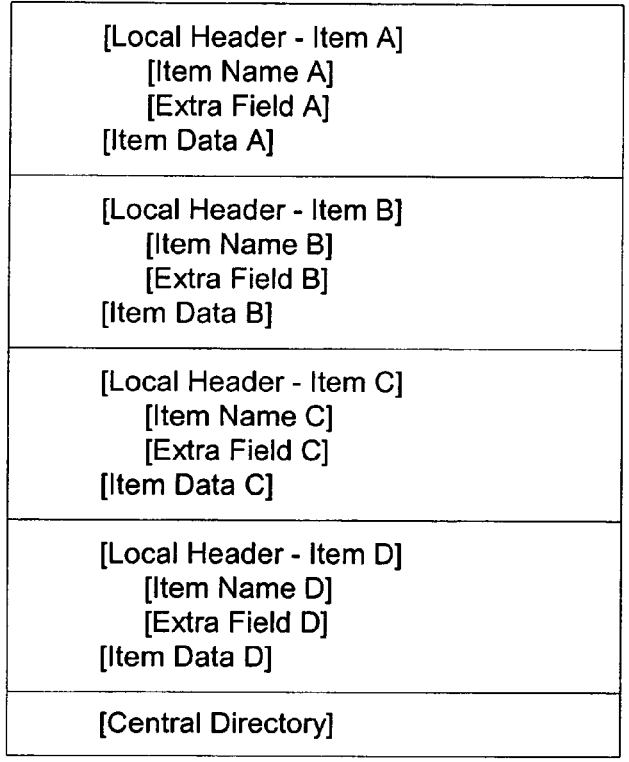
FIG. 1 illustrates an example embodiment of an archive file.

Referring now to FIG. 1, an example embodiment of an archive file 10 is shown. Generally, file 10 includes a plurality of discrete components, referred to herein as "archive items." Example file 10 includes four archive items A, B, C, and D. Each item A, B, C, and D can include a variety of data. For example, a file created by a word processing program such as Microsoft® Word can include formatted text and embedded objects such as pictures. In addition, the file can include metadata, or data relating to attributes of the file itself. The file can include other types of data as well.

In the example shown, item A of file 10 includes metadata associated with file 10, item B includes a font associated with file 10, item C includes text associated with file 10, and item D includes an embedded object such as a picture associated with file 10. More or fewer items, as well as different types of items and data associated with the items, can also be associated with a file such as file 10.

As shown in FIG. 1, each item A, B, C, and D of example file 10 includes a local header including an item name and an extra data field, as well as an item data field. The item name field is a variable length field including the name of the particular item such as, for example, "information.dat." The extra data field is a variable length data field that is described further below. The item data field includes the data associated with the particular item (e.g., the metadata, text, embedded object, etc.).

File 10 also includes a central directory located at the end of the file. The central directory acts as a directory for the various archive items that make up file 10. Typically, the central directory is composed of multiple entries called "central directory entries," with one "central directory entry" for each item in the archive file. The archive file can include other components as well, such as an "end of central directory" record (not shown) that designates the end of the central directory.

In the examples described herein, file 10 is constructed according to the ZIP file format. Each item A, B, C, and D of file 10 is stored logically in a single, uninterrupted sequence of bytes in the archive file.

Additional details regarding the .ZIP file format can be found in "APPNOTE.TXT—.ZIP File Format Specification," Version 6.2.0, Revised Apr. 26, 2004, copyright 1989-2004 to PKWARE Inc., the entirety of which is hereby incorporated by reference.

In alternative embodiments, other file formats that include contiguous "chunks" of data such as, for example, multi-purpose Internet mail extensions ("MIME") and extensible markup language ("XML") formats, can also be used.

Figure 2:
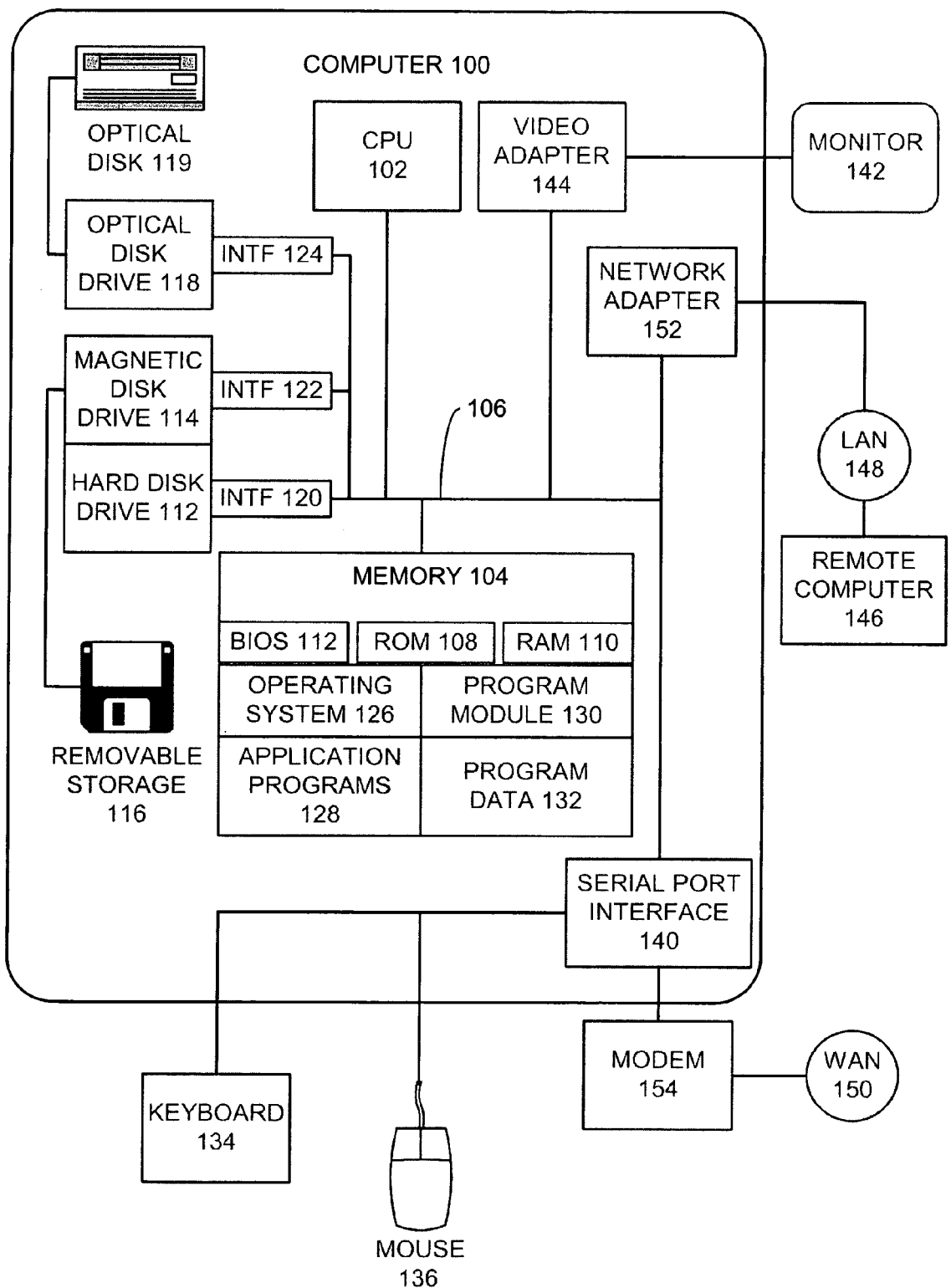
FIG. 2 illustrates an example general purpose computing system according to one embodiment of the present invention.

Referring now to FIG. 2, file 10 can be used to store data created by applications running on a computer system, such as example computer system 100. For example, file 10 can be a document created on computer system 100 using applications such as Microsoft® Word, Excel, or Power-Point®. Other applications can also be used to create file 10.

Computer system 100 can take a variety of forms such as, for example, a desktop computer, a laptop computer, and a hand-held computer. In addition, although computer system 100 is illustrated, the systems and methods disclosed herein can be implemented in various alternative computer systems as well.

The system 100 includes a processor unit 102, a system memory 104, and a system bus 106 that couples various system components including the system memory 104 to the processor unit 102. The system bus 106 can be any of several types of bus structures including a memory bus, a peripheral bus and a local bus using any of a variety of bus architectures. The system memory includes read only memory (ROM) 108 and random access memory (RAM) 110. A basic input/output system 112 (BIOS), which contains basic routines that help transfer information between elements within the computer system 100, is stored in ROM 108.

The computer system 100 further includes a hard disk drive 112 for reading from and writing to a hard disk, a magnetic disk drive 114 for reading from or writing to a removable magnetic disk 116, and an optical disk drive 118 for reading from or writing to a removable optical disk 119 such as a CD ROM, DVD, or other optical media. The hard disk drive 112, magnetic disk drive 114, and optical disk drive 118 are connected to the system bus 106 by a hard disk drive interface 120, a magnetic disk drive interface 122, and an optical drive interface 124, respectively. The drives and their associated computer-readable media provide nonvolatile storage of computer readable instructions, data structures, programs, and other data for the computer system 100.

Although the example environment described herein can employ a hard disk 112, a removable magnetic disk 116, and a removable optical disk 119, other types of computer-readable media capable of storing data can be used in the example system 100. Examples of these other types of computer-readable mediums that can be used in the example operating environment include magnetic cassettes, flash memory cards, digital video disks, Bernoulli cartridges, random access memories (RAMs), and read only memories (ROMs).

A number of program modules can be stored on the hard disk 112, magnetic disk 116, optical disk 119, ROM 108, or RAM 110, including an operating system 126, one or more application programs 128, other program modules 130, and program data 132.

A user may enter commands and information into the computer system 100 through input devices such as, for example, a keyboard 134, mouse 136, or other pointing device. Examples of other input devices include a toolbar, menu, touch screen, microphone, joystick, game pad, pen, satellite dish, and scanner. These and other input devices are often connected to the processing unit 102 through a serial port interface 140 that is coupled to the system bus 106. Nevertheless, these input devices also may be connected by other interfaces, such as a parallel port, game port, or a universal serial bus (USB). An LCD display 142 or other type of display device is also connected to the system bus 106 via an interface, such as a video adapter 144. In addition to the display 142, computer systems can typically include other peripheral output devices (not shown), such as speakers and printers.

The computer system 100 may operate in a networked environment using logical connections to one or more remote computers, such as a remote computer 146. The remote computer 146 may be a computer system, a server, a router, a network PC, a peer device or other common network node, and typically includes many or all of the elements described above relative to the computer system 100. The network connections include a local area network (LAN) 148 and a wide area network (WAN) 150. Such networking environments are commonplace in offices, enterprise-wide computer networks, intranets, and the Internet.

When used in a LAN networking environment, the computer system 100 is connected to the local network 148 through a network interface or adapter 152. When used in a WAN networking environment, the computer system 100 typically includes a modem 154 or other means for establishing communications over the wide area network 150, such as the Internet. The modem 154, which can be internal or external, is connected to the system bus 106 via the serial port interface 140. In a networked environment, program modules depicted relative to the computer system 100, or portions thereof, may be stored in the remote memory storage device. It will be appreciated that the network connections shown are examples and other means of establishing a communications link between the computers may be used.

The embodiments described herein can be implemented as logical operations in a computing system. The logical operations can be implemented (1) as a sequence of computer implemented steps or program modules running on a computer system and (2) as interconnected logic or hardware modules running within the computing system. This implementation is a matter of choice dependent on the performance requirements of the specific computing system. Accordingly, the logical operations making up the embodiments described herein are referred to as operations, steps, or modules. It will be recognized by one of ordinary skill in the art that these operations, steps, and modules may be implemented in software, in firmware, in special purpose digital logic, and any combination thereof without deviating from the spirit and scope of the present invention as recited within the claims attached hereto. This software, firmware, or similar sequence of computer instructions may be encoded and stored upon computer readable storage medium and may also be encoded within a carrier-wave signal for transmission between computing devices.

Figure 3:
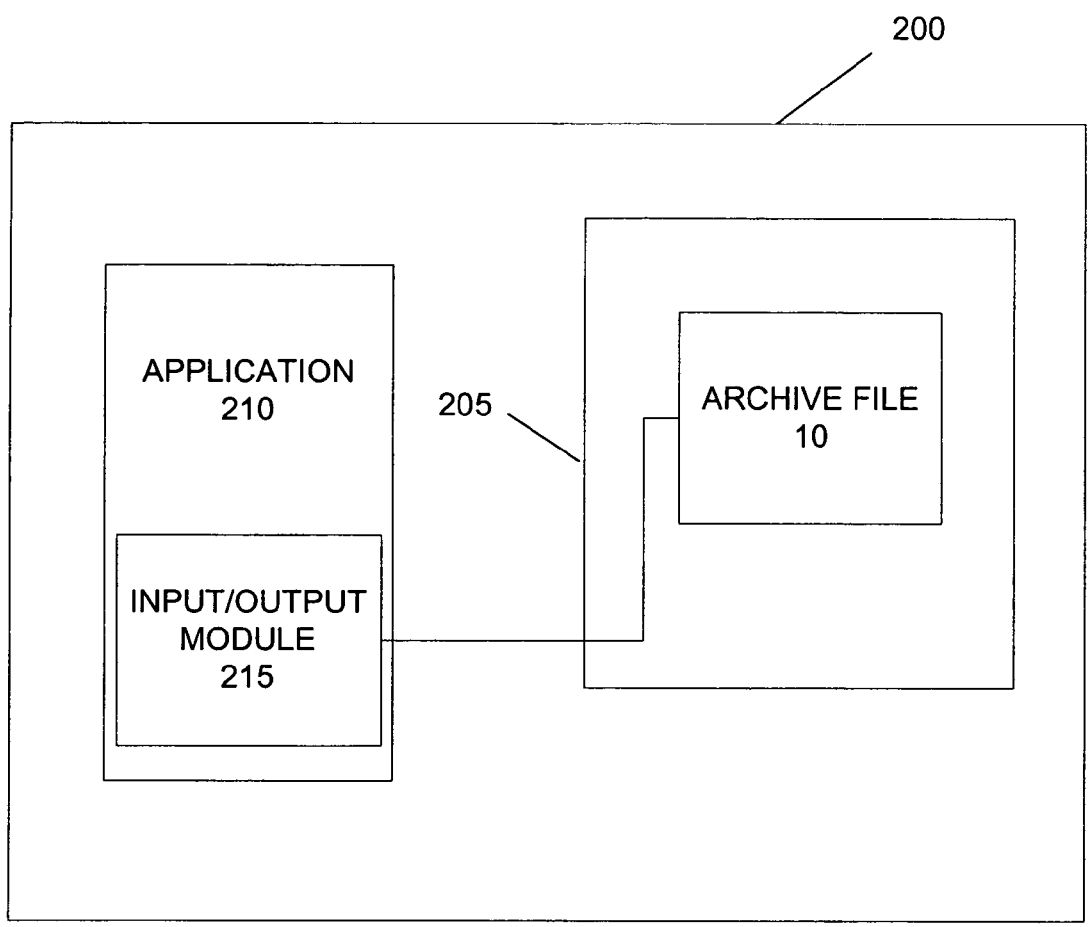
FIG. 3 illustrates another example general purpose computing system according to another embodiment of the present invention.

Referring now to FIG. 3, an example computer system 200 (similar to system 100 described above) is shown. Computer system 200 includes an application program 210 including an input/output module 215, and a storage medium 205 (e.g., optical disk drive 112, magnetic disk drive 114 with removable storage 116, or hard disk drive 118 described above). Archive file 10 is created by application 210 and is stored on storage medium 205.

In the example shown, application program 210 is a word processing program, such as Microsoft® Word, and file 10 is a document created by application 210 and stored on storage medium 205. In the example shown, file 10 is an XML-based document including a plurality of items A, B, C, D. Other types of application programs and files can also be used.

As shown in FIG. 1 and described above, each item A, B, C, and D and the central directory of file 10 is stored in a contiguous manner on storage medium 205. As input/output module 215 of application 210 modifies file 10, items in file 10 can change in size. For example, if data is added to file 10, items in file 10 can grow. Likewise, if data is removed from file 10, items in file 10 can shrink. As items in file 10 change in size, it is necessary to modify file 10 to accommodate for the changes in size.

Figure 4:
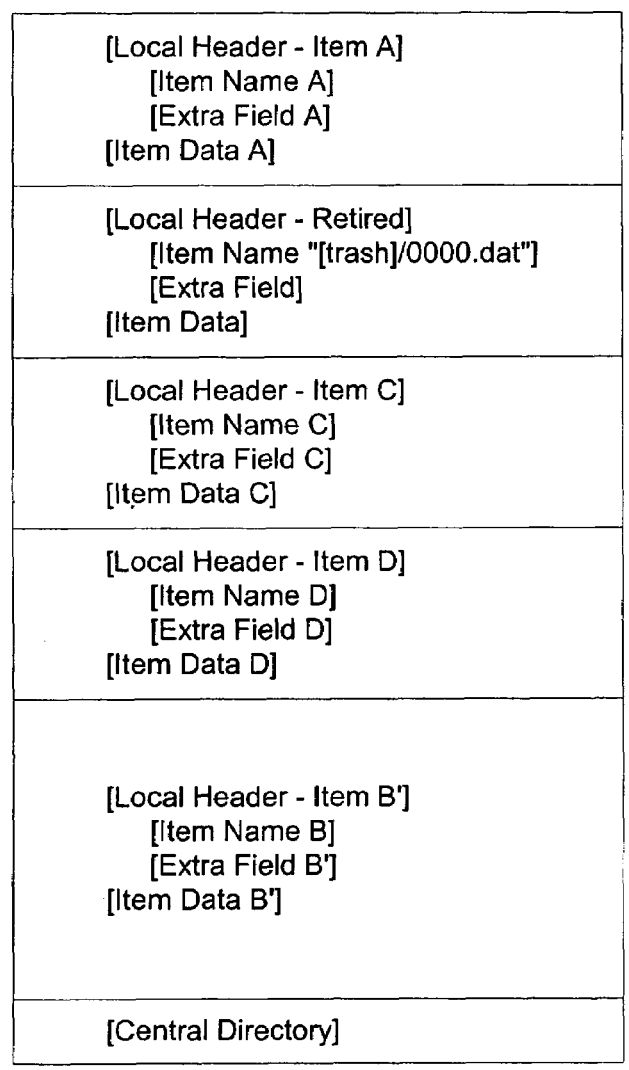
FIG. 4 illustrates the example archive file of FIG. 1 with one archive item retired.

Referring now to FIG. 4, in one embodiment, application 210 changes the content of item B of file 10. For example, application 210 can add data to the item data field of item B, thereby increasing the size of item B.

In the example, instead of changing the size of item B and shifting/rewriting the following items C and D of file 10, item B is "retired," and item B is rewritten at the end of the archive file 10 as new item B'. Generally, when a changed item is retired, the original item is left in place in the archive file and the changed item (including the original item and the changes to the item) is rewritten at the end of the archive. In this manner, when item B is retired, it is not necessary to shift and rewrite items C and D to storage medium 205 as would otherwise be required due to the contiguous nature of the items of file 10. Instead, item B is retired and only new item B' (including original item B and the changes to item B) and the central directory need to be rewritten.

Multiple items can be retired as items change in size. For example, if item A changes in size after item B has been retired, item A can likewise be retired and item A' written at the end of the archive file.

In some embodiments, when item B is retired, the item name is changed. In one example, the item name for retired item B is changed to a unique item name designated by a four-digit hexadecimal number such as "XXXX.dat". In one example, the item names for retired items are designated in ascending order from "0000" to "FFFF". If the designated item name "FFFF" is exceeded for a subsequent retired file, all retired items can be deleted (i.e., all retired items are removed from the archive file 10 and the file is compacted by rewriting all archive items to account for the removed retired parts), and the naming convention can be restarted at "0000".

In addition, in some embodiments, a naming convention is used such that each retired item is renamed "[trash]/XXXX.dat". The "[trash]" directory is a specified directory that is designated to hold all retired items. In this manner, if the items of archive file 10 are later extracted, all retired items are extracted to the separate directory labeled "[trash]".

Other naming conventions for the retired items can also be used. For example, in other embodiments, more than four digits can be used to designate retired items so that an increased number of items can be retired before deletion occurs. In yet other embodiments, each retired item can be designated a randomly generated name.

In some embodiments, the data of the item is cleared upon retirement. For example, the data of the retired item can be rewritten with Null characters, such as zeros. In an example embodiment, the first four bytes of data in a retired item are set to 0xFFFFFFFF and the remaining bytes are set to zero. This allows the cyclic redundancy check (CRC) of each retired item to be a constant value (0xFFFFFFFF) so that it does not have to be calculated. In addition, retired items are typically not compressed if the content of the retired items have been rewritten with Null characters.

In some embodiments, if the changed item is the last item in the archive file (e.g., item D in file 10), the item is rewritten instead of being retired. The central directory can then be rewritten as necessary to accommodate for the change in size of the changed item.

Figure 5:
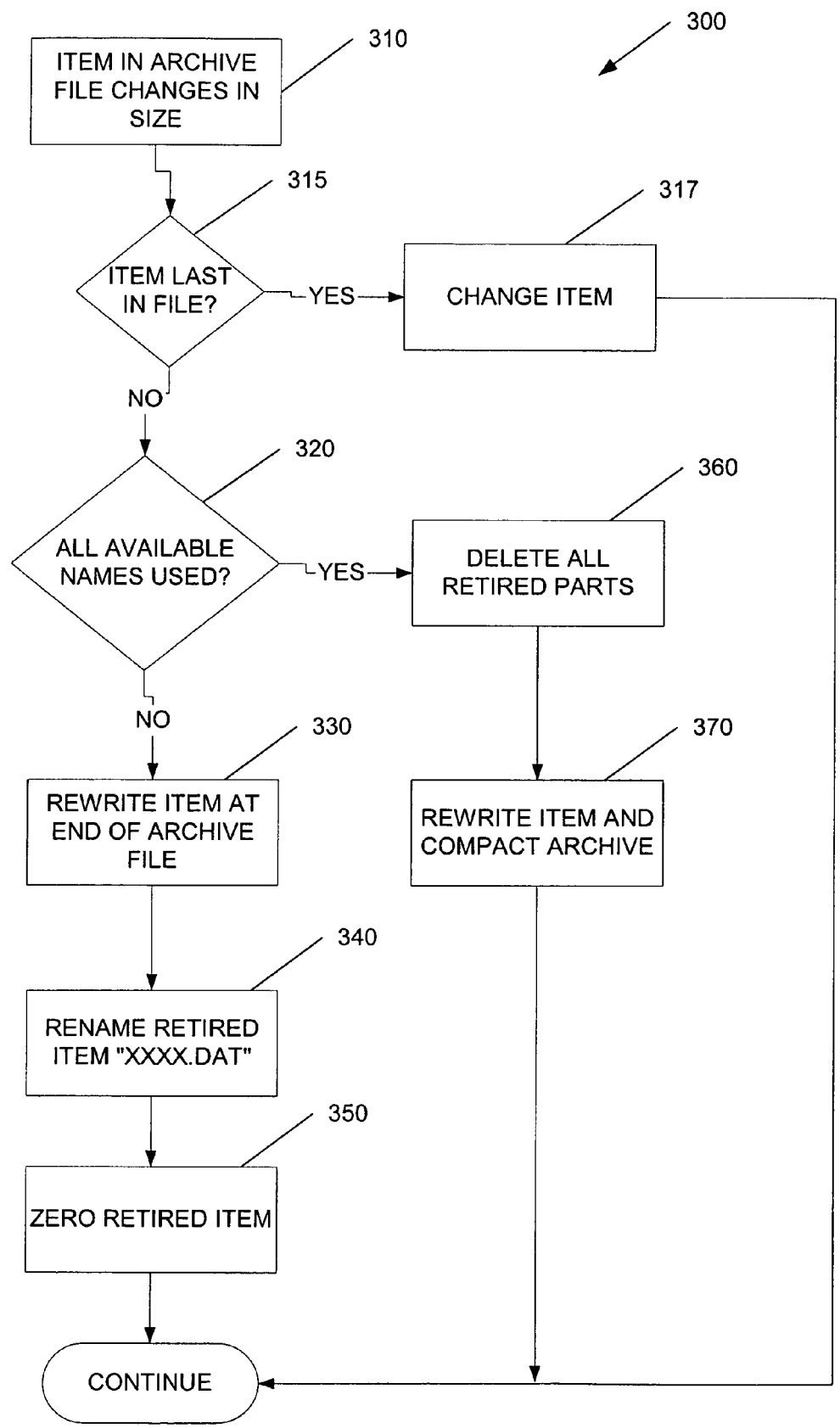
FIG. 5 illustrates an example method of retiring an archive item.

Referring now to FIG. 5, an example method 300 for retiring an item is shown. In operation 310, an item in an archive file is changed, resulting in a change in size for the item. Next, in operation 315, a determination is made regarding whether the changed item is the last item in the archive file. If the changed item is the last item in the file, control is passed to operation 317 and the item is changed. The central directory is also rewritten as necessary to accommodate for the change in size of the last item.

If the changed item is not the last item in the archive file, control is passed from operation 315 to operation 320. In operation 320, a determination is made regarding whether all available names in the naming convention for retired items have been used. If all available names have been used, control is passed to operation 360, which is described below.

If all available names have not been used, control is passed to operation 330 and the changed item is rewritten at the end of the archive file, along with rewriting of the central directory as necessary. Next, in operation 340, the retired item is renamed with the next hexadecimal value according to the retired item naming convention ("XXXX.dat"). Next, in operation 350, the content of the retired item is cleared by writing zeros over all data in the retired item.

Referring back to operations 320 and 360, if all available names have been used, all retired items are deleted from the archive file. Next, in operation 370, the changed item and other items are rewritten as necessary to compact the archive file to account for the deleted retired items, and the naming convention restarts for the next retired item at "0000.dat".

Figure 6:
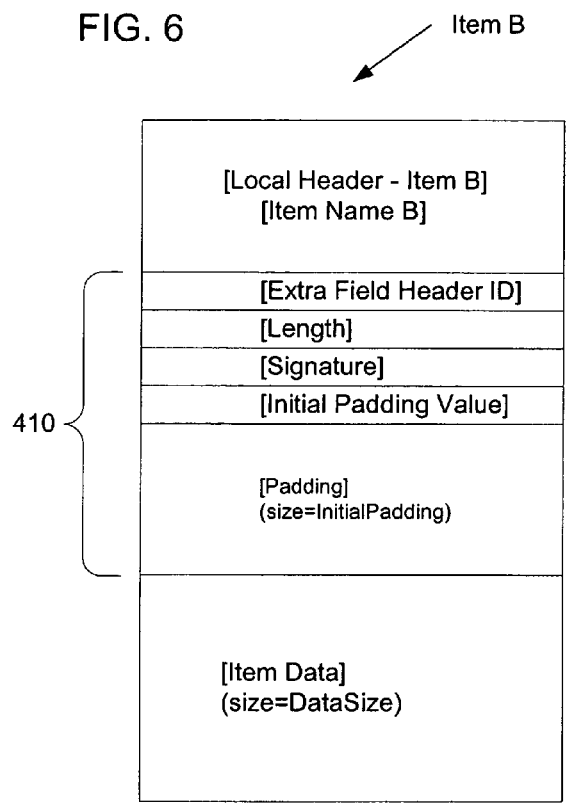
FIG. 6 illustrates an example embodiment of an archive item of an archive file.
Figure 7:
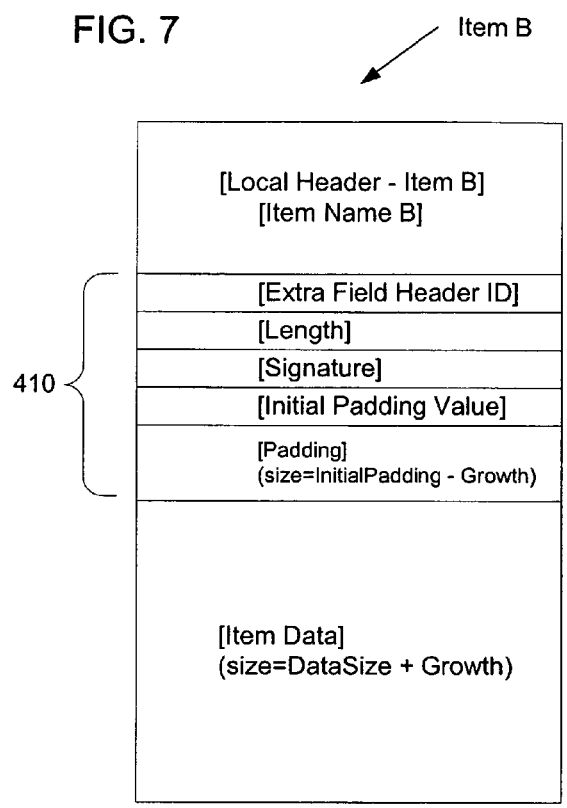
FIG. 7 illustrates the example archive item of FIG. 6 with a portion of the padding of the archive item being used for item data.

Referring now to FIGS. 6 and 7, example item B of archive file 10 is shown in isolation. An example extra field 410 of item B is shown in greater detail. Extra field 410 includes a header ID field, a length field, a signature field, an initial padding value field, and a padding field. The header ID field (2 bytes, typically 0xA220) identifies the field as an extra field for item B. The value field (2 bytes) is a hexadecimal number designating the total length of the extra field. The signature field (2 bytes, typically 0xA208) identifies the owner of the extra field 410. The initial padding length field (2 bytes, referred to as "InitialPadding") is a hexadecimal number representing the length of the padding field at the time item B is created. The padding field is a variable length field having the size of "InitialPadding." In the example, the padding field is initially filled with NULL characters.

Instead of retiring item B when item B changes in size, the padding field can be utilized to absorb the change in size. For example, when item B grows in size, a portion of the padding field is absorbed by the item data to accommodate the growth without requiring a change in the overall size of item B.

Specifically, as shown in the example of FIG. 7, as the item data field of item B grows in size (i.e., item field size=DataSize+Growth), a portion of the padding field is absorbed by the item data field to accommodate the growth. The size of the padding field is reduced in size (padding size=InitialPadding−Growth). Therefore, while the extra data field 410 shrinks in size, the overall size of item B remains the same, so that items following item B in the archive file (e.g., items C and D shown in FIG. 1) do not need to be shifted/rewritten to accommodate the change in size of the item data field of item B.

In a similar manner, if item B shrinks in size (instead of grows as illustrated in FIG. 7), the extra space can be absorbed into the padding field of item B so that the overall size of item B remains unchanged. An archive item can continue to borrow and return portions of its padding to accommodate for changes in its size.

Figure 8:
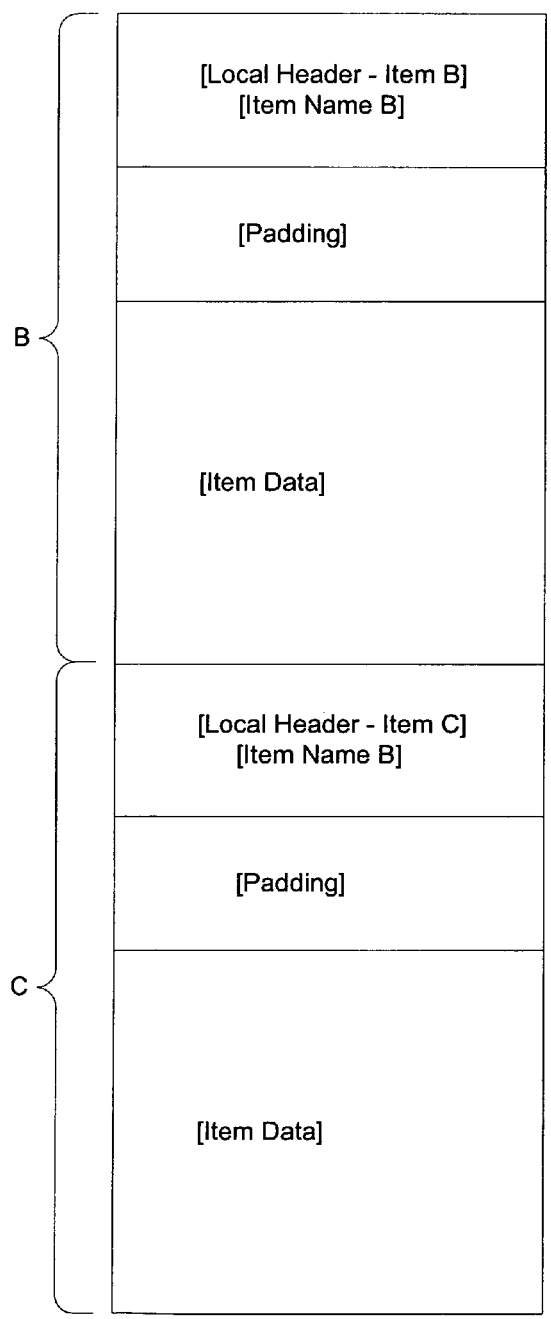
FIG. 8 illustrates an example embodiment of archive items of an archive file.
Figure 9:
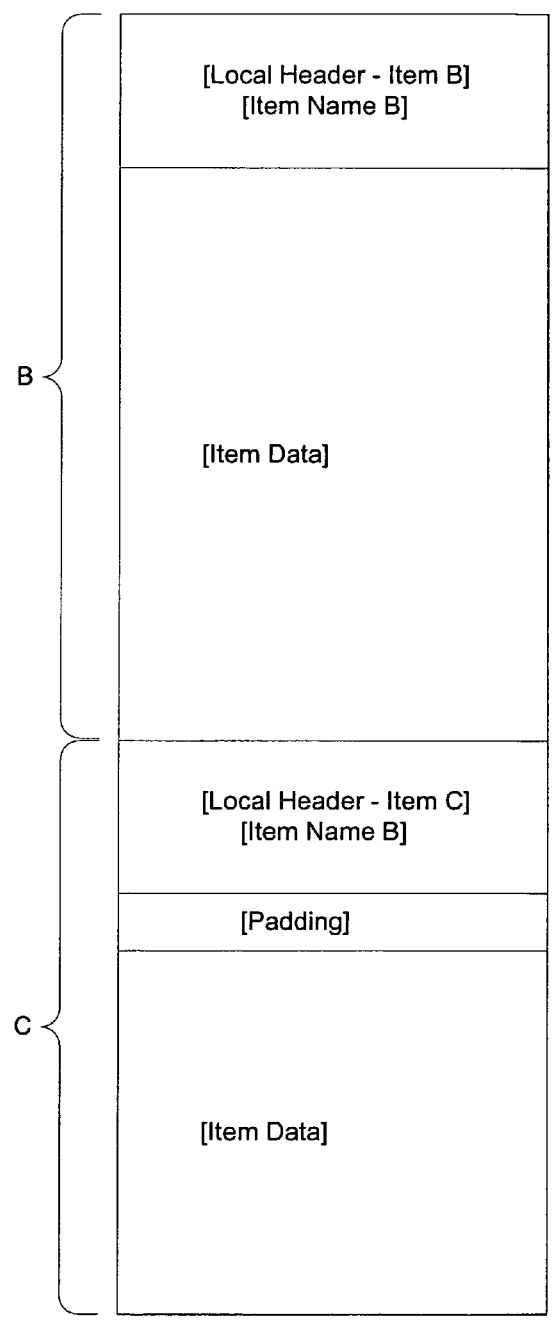
FIG. 9 illustrates the example archive items of FIG. 8 with portions of the padding of the archive items being used for item data.

Referring to FIGS. 8 and 9, in some embodiments, if the item data field of a particular items grows in an amount that cannot be accommodated by the item's available padding, the item can "borrow" additional space from the padding for one or more adjacent items to accommodate the change. For example, FIG. 8 shows items B and C of file 10 (the padding for items B and C is shown in a simplified format).

As shown in FIG. 9, when the item data for item B grows larger than the padding for item B can accommodate, some of the padding from next item C is absorbed to accommodate the growth. In this manner, the overall size of item B increased, while the overall size of item C decreased by a like amount. Item B and the local header for item C must therefore be rewritten. However, the total size of items B and C remains the same so that items following items B and C (e.g., item D shown in FIG. 1) do not need to be rewritten.

In other embodiments, padding from items positioned before the item changing in size can also be used. In yet other embodiments, the padding from more than one item can be used to accommodate changes in size of an archive item. Further, the contents of the retired item can also be used as padding. In some embodiments, adjacent retired items can be combined into a single retired item that can be used as padding for adjacent, non-retired items.

Figure 10:
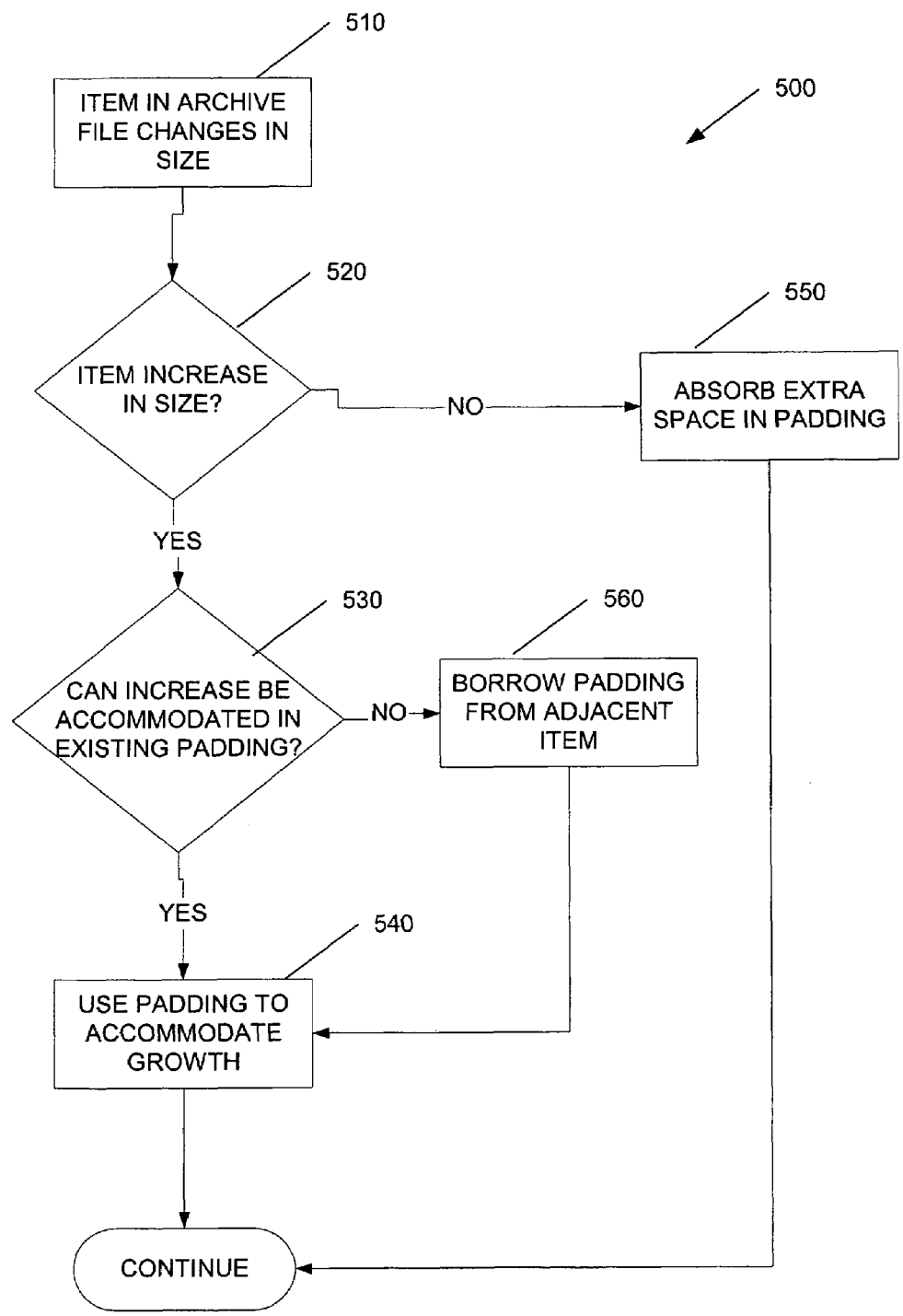
FIG. 10 illustrates an example method of using padding to accommodate a change in size of an archive item.

Referring now to FIG. 10, an example method 500 for using padding to accommodate changes in size of an archive item of an archive file is shown. In operation 510, an item of an archive file changes in size. In operation 520, a determination is made regarding whether the change results in an increase in the size of the item data for the item. If the change results in a decrease in size of the item, control is passed to operation 550, and the extra space resulting from the decrease in the size of the item data of the item is absorbed in the padding of the item.

If the item does increase in size, control is passed from operation 520 to operation 530, where a determination is made regarding whether the increase in size can be accommodated by the existing padding for the item. If the existing padding cannot accommodate the change in size, control is passed to operation 560 and padding from one or more adjacent items is absorbed to accommodate the change in size. Next, control is passed from either operation 530 or 560 to operation 540, and the padding is used to accommodate the growth for the item data so that the overall size of the item does not change.

Padding can be provided for one or more of the items of an archive. It can be desirable to provide padding for items that are small in size or change frequently in size. For example, items associated with the metadata for an archive file can change frequently in small increments. For example, metadata associated with the list of users who have edited the archive file can slightly increase the item's size each time a new user edits a file and is added to the list. Instead of retiring the item associated with this metadata each time a user is added, padding can be used to accommodate the changes in size.

In one embodiment, the maximum allowed size for the padding field for an item of an archive file is 32 kilobytes. Therefore, if the data field of an item grows in an amount greater than the available padding (32 kilobytes—existing padding) and padding from adjacent items cannot be absorbed to accommodate the growth, the item can either be (i) retired, or (ii) rewritten along with any items that follow in the archive file.

Figure 11:
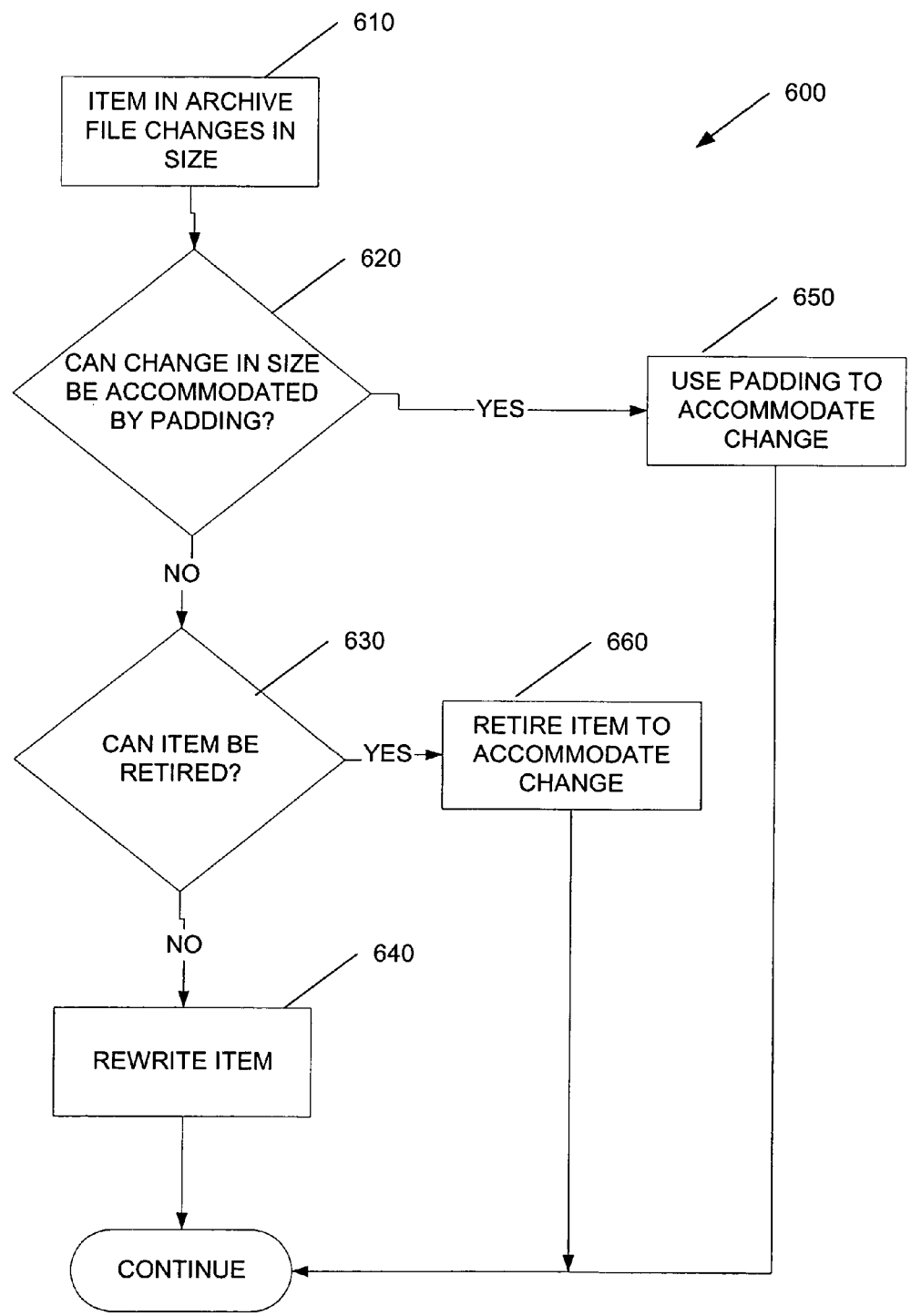
FIG. 11 illustrates an example method of accommodating a change in size of an archive item using padding and retiring.

For example, referring now to FIG. 11, an example method 600 for accommodating a change in an item's size is shown. Method 600 utilizes both the padding for an item and retirement of items to accommodate for changes in size.

In operation 610, an item in an archive file is modified and changes in size. Next, in operation 620, a determination is made regarding whether the change in size can be accommodated by the padding for the item and/or the padding of adjacent items. If the change can be accommodated using padding, control is passed to operation 650 and the padding is used to accommodate the change (see, e.g., method 500 shown in FIG. 10).

If the change cannot be accommodated using padding, control is passed from operation 620 to operation 630, where a determination is made regarding whether the item can be retired. If the item can be retired, control is passed to operation 660 and the item is retired and a new item is written at the end of the archive file (see, e.g., method 300 shown in FIG. 5).

Finally, if the item cannot be retired, control is passed from operation 630 to operation 640, and the item is rewritten along with any items following the modified item of the archive file.

In some embodiments, an item that is to be retired cannot be renamed according to the naming convention "[trash]/XXXX.dat" because the item does not have enough space to accommodate the name change without increasing in its overall size. In this case, the entire item to be retired can be absorbed into the padding of an adjacent item so that the adjacent item increases such that the adjacent item's overall size is the combination of the retired item and the adjacent item. If the adjacent item cannot accommodate the size of the item to be retired in its padding, the item to be retired can be (i) absorbed into the padding of two or more adjacent items, or (ii) padding can be borrowed from one or more items to allow the item to be retired to be renamed and retired accordingly.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

The invention claimed is:

1. A computing system, comprising:
a storage medium;
an application programmed to create a file including a first item and a second item, the application storing the file on the storage medium, and the first item including a padding field; and
an input/output module associated with the application, the input/output module being programmed to:
use at least a portion of the padding field of the first item to accommodate a change in a size of the first item,
determine if the padding field of the first item can accommodate the change in the size of the first item,
borrow at least a portion of a padding field of the second item if the padding field of the first item cannot accommodate the change in the size of the first item, and
write the first item to the storage medium.

2. The system of claim 1, wherein the first item further comprises:
an item data field including data associated with the item.

3. The system of claim 1, wherein the file is an archive file.

4. The system of claim 1, wherein, upon retirement of the first item, the input/output module is further programmed to have the first item be absorbed into a padding field of the second item.

5. The system of claim 1, wherein the input/output module is further programmed to:
determine if the padding field of the first item can accommodate the change in the size of the first item; and
retire the first item if the padding field of the first item cannot accommodate the change in the size of the first item.

6. The system of claim 1, wherein the second item is a retired item, and wherein the second item is used as a padding field to accommodate the change in the size of the first item.

7. The system of claim 6, wherein the second item includes at least two adjacent retired items.

8. A method for changing items of a file, comprising:
providing a file including at least a first item and a second item, the first item including a padding field;
changing the first item;
using at least a portion of the padding field of the first item to accommodate a change in a size of the first item, wherein using at least the portion of the padding field of the first item further comprises:
determining if the padding field of the first item can accommodate the change in the size of the first item, and
retiring the first item if the padding field of the first item cannot accommodate the change in the size of the first item; and
writing the first item to a storage medium.

9. The method of claim 8, further comprising absorbing the first item into a padding field of the second item upon retirement of the first item.

10. The method of claim 8, wherein using at least the portion of the padding field of the first item further comprises:
determining if the padding field of the first item can accommodate the change in the size of the first item; and
borrowing at least a portion of a padding field of the second item if the padding field of the first item cannot accommodate the change in the size of the first item.

11. The method of claim 8, further comprising:
retiring the second item; and
using the second item as a padding field to accommodate the change in the size of the first item.

12. The method of claim 11, further comprising combining two adjacent retired items to form the second item.

13. A computer-readable storage medium having computer-executable instructions for performing steps comprising:
providing a file including at least a first item and a second item, the first item including a padding field;
changing the first item;

using at least a portion of the padding field of the first item to accommodate a change in a size of the first item, wherein using at least the portion of the padding field of the first item further comprises:

determining if the padding field of the first item can accommodate the change in the size of the first item, and borrowing at least a portion of a padding field of the second item if the padding field of the first item cannot accommodate the change in the size of the first item; and writing the first item to the storage medium.

14. The computer-readable storage medium of claim 13, further comprising absorbing the first item into a padding field of the second item upon retirement of the first item.

15. The computer-readable storage medium of claim 13, wherein using at least the portion of the padding field of the first item further comprises:

determining if the padding field of the first item can accommodate the change in the size of the first item; and retiring the first item if the padding field of the first item cannot accommodate the change in the size of the first item.

16. The computer-readable storage medium of claim 13, further comprising:

retiring the second item; and using the second item as a padding field to accommodate the change in the size of the first item.

17. The computer-readable storage medium of claim 16, further comprising combining two adjacent retired items to form the second item.

* * * * *